US011713690B2

(12) United States Patent
Hinderliter et al.

(10) Patent No.: US 11,713,690 B2
(45) Date of Patent: Aug. 1, 2023

(54) INTEGRATED MOBILE POWER UNIT FOR HYDRAULIC FRACTURING

(71) Applicant: U.S. Well Services, LLC, Houston, TX (US)

(72) Inventors: Brandon N. Hinderliter, Houston, TX (US); Jared Oehring, Houston, TX (US)

(73) Assignee: U.S. Well Services, LLC, Houston, TX (US)

(*) Notice: Subject to any disclaimer, the term of this patent is extended or adjusted under 35 U.S.C. 154(b) by 0 days.

(21) Appl. No.: 17/540,807

(22) Filed: Dec. 2, 2021

(65) Prior Publication Data

US 2022/0094173 A1    Mar. 24, 2022

Related U.S. Application Data

(63) Continuation of application No. 16/443,273, filed on Jun. 17, 2019, now Pat. No. 11,211,801.

(60) Provisional application No. 62/685,797, filed on Jun. 15, 2018.

(51) Int. Cl.
| | |
|---|---|
| *F01D 15/10* | (2006.01) |
| *E21B 41/00* | (2006.01) |
| *G05B 15/02* | (2006.01) |
| *E21B 43/26* | (2006.01) |
| *E21B 43/16* | (2006.01) |

(52) U.S. Cl.
CPC .......... *F01D 15/10* (2013.01); *E21B 41/0085* (2013.01); *E21B 43/2607* (2020.05); *G05B 15/02* (2013.01); *E21B 43/16* (2013.01)

(58) Field of Classification Search
None
See application file for complete search history.

(56) References Cited

U.S. PATENT DOCUMENTS

| | | | |
|---|---|---|---|
| 6,765,304 B2 * | 7/2004 | Baten | F02B 63/04 290/1 A |
| 2012/0029716 A1 * | 2/2012 | Sekoguchi | H02J 3/38 700/297 |
| 2016/0105022 A1 * | 4/2016 | Oehring | H02J 3/14 307/29 |
| 2017/0222409 A1 * | 8/2017 | Oehring | F04B 17/03 |

* cited by examiner

*Primary Examiner* — Ryan D. Coyer
(74) *Attorney, Agent, or Firm* — Hogan Lovells US LLP

(57) ABSTRACT

A hydraulic fracturing system is disclosed as including a singular mobile platform of at least one mobile power unit (MPU) and at least one first switch gear that is configured to handle electric power from the MPU. The MPU is configured to generate voltage that matches the capabilities of an electrical bus from the at least one switch gear such that a combined electrical current generated as a result of the generated voltage and required load is provided to the electrical bus to the components of the hydraulic fracturing system. Further, the hydraulic fracturing system may include electrical fracturing equipment with at least one second switch gear to support the at least one first switch gear in handling electric power from the MPU. A datavan may be included in the system to control load shedding, load sharing, and power distribution for the electrical fracturing equipment comprising the at least one second switch gear.

20 Claims, 11 Drawing Sheets

INTEGRATED MOBILE POWER UNIT FOR HYDRAULIC FRACTURING

RELATED APPLICATION

The present disclosure is a continuation of U.S. patent application Ser. No. 16/443,273 titled INTEGRATED MOBILE POWER UNIT FOR HYDRAULIC FRACTURING, which claims priority to U.S. Patent Provisional Application No. 62/685,797, titled INTEGRATED MOBILE POWER UNIT FOR HYDRAULIC FRACTURING, filed on Jun. 15, 2018, the entirety of the disclosures of which are incorporated by reference herein for all intents and purposes.

BACKGROUND

1. Field of Invention

The present disclosure generally relates to hydraulic fracturing. In particular, the present disclosure relates to mobile grid assembly for powering an electric hydraulic fracturing pump in limited space environments.

2. Related Technology

Fracturing, such as hydraulic fracturing, stimulates production from hydrocarbon producing wells. Such a process may utilize mobile systems for injection of fluid into wellbores at pressure to provide subterranean fissures in the area around the wellbores. Such a process relies on fracturing fluid slurry that has been pressurized using high pressure pumps. As this is a mobile process, the high pressure pumps are mounted on mobile surfaces—e.g., truck-beds, trailers, etc. Moreover, the high pressure pumps are powered by mobile power sources, such as diesel engines. However, the components, such as the high pressure pumps and associated power sources have large volume and mass. As such, the mobile surfaces may be heavy duty trailers, trucks, or skids that are used for transporting these components to remote sites where wellbores are being fractured. The components support hydraulic fracturing pumps that draw low pressure fluid slurry (at approximately 100 psi). The discharge of the same fluid slurry, however, is at high pressures of up to 15,000 psi or more. In addition, alternate mobile power sources, such as turbine generators, are available to perform the power functions of the diesel engines. At the remote site, the power sources are electrically connected to power the fracturing components. For example, motors for pressurizing fracturing and hydraulic fluids are connected to the power sources using power buses. Electrical connections may be complex, unsafe, unreliable, and may include numerous configurations requiring space and time to resolve.

SUMMARY

Herein disclosed are examples of a hydraulic fracturing system that includes a singular mobile platform of at least one mobile power unit (MPU) and at least one first switch gear that is configured to handle electric power from the MPU. The at least one MPU is configured to generate voltage that matches the requirements of load and an electrical bus of the at least one first switch gear, such that a combined electrical current generated as a result of the generated voltage is provided through the electrical bus to the components of the hydraulic fracturing system. Further, the hydraulic fracturing system may include electrical fracturing equipment with at least one second switch gear to support the at least one first switch gear in handling electric power from the at the least one MPU. Automated control software may be included in the system to control load shedding, load sharing, and power distribution for the electrical fracturing equipment comprising the at least one second switch gear. In addition, the switchgear may be separate units or incorporated into the MPUs. Fracturing equipment, including the electrical load, may include specific voltage and current requirements. The electrical bus is, therefore, sized to match the MPU's capabilities based on the load requirements. Electrical buses may be rated in terms of maximum capability before failure, such as a voltage class of 5000V, 15000V, or 25000V, and having a current rating such as 1200 A, 2000 A, or 3000 A.

BRIEF DESCRIPTION OF THE DRAWINGS

Some of the features and benefits of the present invention having been stated, others will become apparent as the description proceeds when taken in conjunction with the accompanying drawings, in which.

Figure 1:
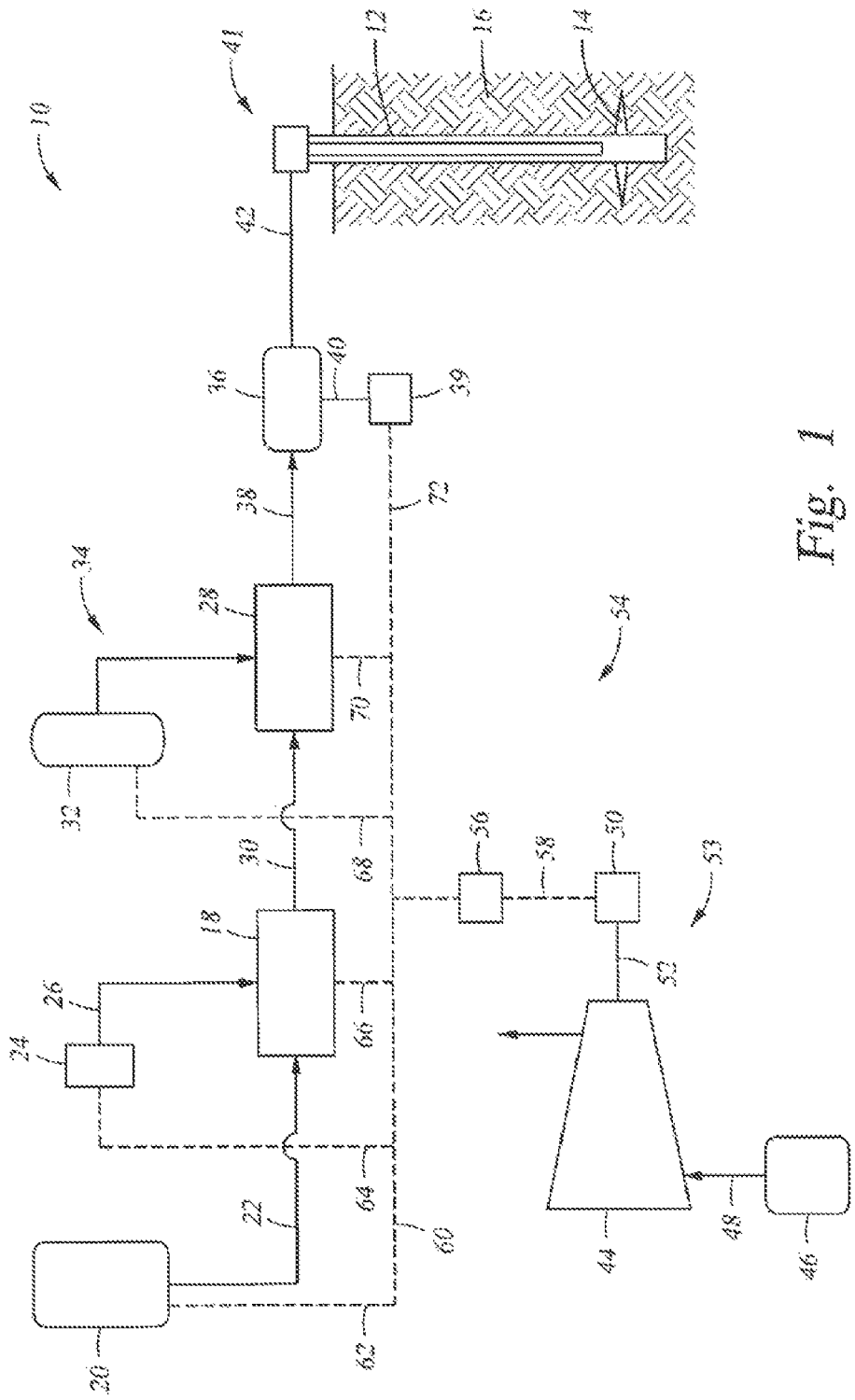
FIG. 1 is a schematic of an example hydraulic fracturing system in accordance with embodiments of the present disclosure.

While the invention will be described in connection with the preferred embodiments, it will be understood that it is not intended to limit the invention to that embodiment. Instead, the preferred embodiments are intended to cover all alternatives, modifications, and equivalents, as may be included within the spirit and scope of the invention as defined by the appended claims

DETAILED DESCRIPTION OF THE DISCLOSURE

So that the manner in which the features and advantages of the embodiments of hydraulic fracturing system and associated methods, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

One system and method for powering electrical equipment from a generator uses a physically separate mobile unit with switch gear installed to act as an electrical distribution hub between the MPUs and electric fracturing equipment of a hydraulic fracturing system. The separate mobile unit is, therefore, physically external relative to a mobile unit hosting the generator and switch gear, for instance. In such an implementation, cables are used to supply power from the MPUs to the mobile switch gear unit and between the mobile switch gear unit to the electric fracturing equipment. Here, fleet wide load sharing and load shedding are available, but such an implementation requires more mobile equipment and power cables. Alternatively, another system and method uses a smaller and less versatile Electronic Equipment Room (EER), with switch gear for the generator, to directly power a small amount of electric equipment. Such a system and method may require lesser physical equipment, but is also electrically limited. For example, such limitations may be for load sharing and load shedding, which may be limited to only the equipment being supplied by a single MPU.

The present embodiments, by at least an MPU working with the switch gear in a single platform or unit resolves the additional issues noted above with the system and methods for a physically separate (e.g., external) mobile unit and an EER. For example, the present implementation at least ensures that MPUs are configured with adequate bus work to carry the generated voltage and current from the MPU's generator. This is further supported by the single platform or unit with reduced cabling and complexity with the MPU sharing space with the switch gear, for instance. The present implementation works with well sites where space is limited and rapid mobilization and demobilization is required. With integrated components on a single skid, for example, fewer physical connections are needed to be established or stowed during transportation. In an example, mobilization and demobilization of a single MPU are then limited to oilfield functions, such as pump down jobs, injection testing, toe preps, low hydraulic horsepower jobs, or to supplement other equipment types (diesel, dual fuel). In addition, extra MPUs and pumps can be used to perform fracturing jobs with high hydraulic horsepower requirements.

Furthermore, the use of integrated switch gear with the MPU eliminates the need for a separate switch gear trailer or skid. This allows for fewer trailers and fewer interconnecting cables saving space and time during mobilization/demobilization. With fewer trailers and cables, capital and maintenance costs are also beneficially addressed by the present implementation. The method of equipment deployment, in the present implementation, is also modular and scalable as turbines of the MPU can be added to directly to power the electric fracturing pumps as needed without the need to add additional switch gear trailers or modify existing trailers with additional gear and cable connections. A complexity sought to be addressed herein is a difficulty to implement a common bus where much of the equipment is on the same circuit. As such, the common bus of the present disclosure supports the voltage and combined current requirements of the various equipment loads. At fracturing sites, fracturing pumps may be inoperable because of fluid distribution problems, mechanical problems, communication problems, control problems, pump problems, sensor problems, etc. While these are unrelated to the electric power generation requirements discussed herein, without a common electrical bus, excess power from a turbine generator cannot be redistributed to other equipment which will limit redundancy in equipment and may cause situations where extra turbines and fracturing pumps will need to be on standby in the event of failures. Other oilfield equipment may be connected to the common electrical bus. In an example, the other oilfield equipment includes intensifier pumps, blenders, dual blenders, hydration units, chemical additive units, data van, sand equipment, lights, CNG equipment, LNG equipment, gas compression, gas filtration, wireline, water transfer, flow back, coil tubing, nitrogen, cementing, dual pumper, drilling rigs, cranes, and workover rigs. There may also be a case where, when a turbine generator fails, the fracturing pumps or other equipment which are electrically tied to it will be rendered inoperable and power will not be available from other generators due to a lack of a common bus for power distribution. As such, the present implementation overcomes these additional issues by load sharing switch gear added to the MPUs in the same trailer or to other connected equipment, but working with the switch gear of the MPUs as discussed throughout this disclosure.

One of ordinary skill would recognize that there are space constraints of mobile equipment. As such, the turbine engine and generators of the MPU in the present implementation may need to be smaller to accommodate the extra integrated switch gear. The reduction in size and capability can create situations where extra MPUs will be needed on well sites with higher hydraulic horsepower requirements. However, to save space and weight, alternative engines and generators may be used (such as aeroderivative turbines or reciprocating engines). Many light and compact turbines may also struggle to burn wide ranges of fuel gas and may need support equipment if the upper or lower heating values are out of the required range, but with the present implementation, redundancies are widely applied to assist with any of these constraints.

The present disclosure, in an embodiment, is to a system including a mobile unit, at least one generator; and at least one switch gear. The at least one generator is coupled to the at least one switch gear on the mobile unit forming a singular and integrated mobile unit. The mobile unit is configured to provide power generated by the at least one generator in electrical buses for at least one load on one or more external mobile unit. In another embodiment, a method is disclosed and includes providing a mobile unit with at least one generator and at least one switchgear, such as a system as described above. The at least one generator is coupled to the at least one switch gear on the mobile unit. The method includes generating power from the at least one generator and providing the power in electrical buses for at least one load in one or more external mobile units. The system may be part of a hydraulic fracturing system that consumes the power and that includes a wellbore and at least one pressuring system to create fractures in a subterranean formation that surrounds the wellbore.

FIG. 1 is a schematic of an example hydraulic fracturing system 10 in accordance with embodiments of the present disclosure. Such a system may be used for pressurizing a wellbore 12 to create fractures 14 in a subterranean formation 16 that surrounds the wellbore 12. System 10 may include a hydration unit 18 that receives fluid from a fluid source 20 via line 22, and may also receive additives from an additive source 24 via line 26. Additive source 24 can be separate from the hydration unit 18 as a stand-alone unit, or can be included as part of the same unit as the hydration unit 18. The fluid, which in one example is water, is mixed inside of the hydration unit 18 with the additives. The fluid and additives are mixed over a period of time to allow for uniform distribution of the additives within the fluid.

In the example of FIG. 1, the fluid and additive mixture is transferred to a blender unit 28 via line 30. A proppant source 32 contains proppant, which is delivered to the blender unit 28 as represented by line 34, where line 34 can be a conveyer. Inside the blender unit 28, the proppant and fluid/additive mixture are combined to form a fracturing slurry, which is then transferred to a fracturing pump system 36 via line 38; thus fluid in line 38 includes the discharge of blender unit 28 which is the suction (or boost) for the fracturing pump system 36. Blender unit 28 can have an onboard chemical additive system, such as with chemical pumps and augers (not shown). Optionally, additive source 24 can provide chemicals to blender unit 28; or a separate and standalone chemical additive system (not shown) can be provided for delivering chemicals to the blender unit 28. In an example, the pressure of the slurry in line 38 ranges from around 80 psi to around 120 psi. The pressure of the slurry can be increased up to around 15,000 psi by pump system 36. A motor 39, which connects to pump system 36 via connection 40, drives pump system 36 so that it can pressurize the slurry.

In one example, the motor 39 is controlled by a variable frequency drive ("VFD"). After being discharged from pump system 36, slurry is injected into a wellhead assembly 41; discharge piping 42 connects discharge of pump system 36 with wellhead assembly 41 and provides a conduit for the slurry between the pump system 36 and the wellhead assembly 41. In an alternative, hoses or other connections can be used to provide a conduit for the slurry between the pump system 36 and the wellhead assembly 41. Optionally, any type of fluid can be pressurized by the fracturing pump system 36 to form a fracturing fluid that is then pumped into the wellbore 12 for fracturing the formation 14, and is not limited to fluids having chemicals or proppant. Examples exist wherein the system 10 includes multiple pumps 36, and multiple motors 39 for driving the multiple pumps 36. Examples also exist wherein the system 10 includes the ability to pump down equipment, instrumentation, or other retrievable items through the slurry into the wellbore.

FIG. 1 additionally provides an example turbine 44, which receives a combustible fuel from a fuel source 46 via a feed line 48. In an example, the turbine is part of a Mobile Power Unit (MPU) or platform. The MPU may be a trailerized, bodyload, or skid mounted electrical power generation unit which can use the turbine or reciprocating engine for power generation. Such a turbine or reciprocating engine can be fueled by the combustible fuel, such as diesel or natural gas, to function as an electrical generator. The MPU can comprise of one or more trailers, composed of the generator, the electrical switching gear, a prime mover (engine), auxiliary loads (cooling, heating, lubricating, diagnostics and control equipment), and fire suppression equipment. The fire suppression equipment can be located on a single chassis, or each on separate chassis or any combination thereof for mobilization purposes which are mechanically or electrically connected while in operation to act as a single power generation unit.

In one example, the fuel source 46 can be a natural gas pipeline, CNG, LNG, or a well proximate the turbine 44. Combustion of the fuel in the turbine 44 in turn powers a generator 50 that produces electricity. Shaft 52 connects generator 50 to turbine 44. The combination of the turbine 44, generator 50, and shaft 52 define a turbine generator 53. In another example, gearing can also be used to connect the turbine 44 and generator 50. An example of a micro-grid 54 is further illustrated in FIG. 1, and which distributes electricity generated by the turbine generator 53. Included with the micro-grid 54 is an optional transformer 56 for stepping up or down voltage of the electricity generated by the generator 50 to a voltage more compatible for use by electrical powered devices in the hydraulic fracturing system 10.

A "split bus" (e.g., dual or triple, or more microgrid) or "single bus" (e.g., microgrid) electric hydraulic fracturing fleet may be available to function with the present disclosure. As used herein, the microgrid may be an off-utility power grid that is closed circuit and self-contained. For example, the microgrid may include at least one electricity generator, one switch gear component, and one active electrical load. The microgrid may also be synced with the utility power grid and pull additional power from the utility power grid. The utility power may be unable to provide all of the needed power for oilfield hydraulic fracturing, drilling, intervention, and other oilfield services; and the use of the microgrid is to supplement or replace the utility power. The split or single bus use external switch gear trailers which are physically separate from the MPU to provide extra switch gear (e.g., breakers, relays, electrical buses) to allow electrical power to be placed on a common bus (e.g., combining the power of two or more generators). The present disclosure, via at least FIGS. 3 to 9, provide novel packaging of the MPU and at least the switch gear to allow a savings on quantity of trailers and to reduce the complexity of the electrical connections. Such a reduction may be by reducing a number of interconnecting power cables. This reduction in equipment will not reduce functionality but will improve mobilization times and simplicity of interfacing various components of the hydraulic fracturing system 10, while reducing space required on a well site as well as capital cost and maintenance costs. In an example, such equipment may include hydraulic fracturing equipment that represents an electrical load addressed by the MPU of the present disclosure. As such the equipment can include hydraulic fracturing pumps, hydration units, chemical units, blenders, proppant storage, conveyer belts, lights, datavans, cranes, wireline equipment, monitoring equipment, water pumps, compressors, heaters, and other supporting equipment.

The switch gear may be any gear such as breakers, switches, and relays that are used to control the distribution of electricity. Electrical safety and diagnostics may also be provided by the switch gear. Each MPU may include at least one large breaker for connecting and disconnecting its own generator from the electrical load. The MPUs may be limited in how much switch gear can be integrated into its chassis due to size and weight requirements for mobility. Many times a separate electronic equipment room is used to supplement the generator to provide switch gear support or dedicated switch gear units (trailers, skids, bodyload trucks) are used to provide load sharing and greater distribution.

In another example, the power generated by the turbine generator and the power utilized by the electrical powered devices in the hydraulic fracturing system 10 are of the same voltage, such as 4160 V so that main power transformers are not needed other than as isolation transformers. In one embodiment, multiple 3500 kVA dry cast coil transformers are utilized. Electricity generated in generator 50 is conveyed to transformer 56 via line 58. In another embodiment, a step-up transformer is provided for transformer 56, where the secondary voltage of the step-up transformer is higher than its primary voltage. Such a usage may be advantageous for remote power transmission to limit transmission losses. In one example, transformer 56 steps the voltage down from 13.8 kV to around 600 V. Other example step down voltages include 4,160 V, 480 V, or other voltages. The output or low voltage side of the transformer 56 connects to a power bus 60, lines 62, 64, 66, 68, 70, and 72 connect to power bus 60 and deliver electricity to electrically powered end users in the system 10. In another example, line 62 connects fluid source 20 to bus 60, line 64 connects additive source 24 to bus 60, line 66 connects hydration unit 18 to bus 60, line 68 connects proppant source 32 to bus 60, line 70 connects blender unit 28 to bus 60, and line 72 connects motor 39 to bus 60. In an example, additive source 24 contains ten or more chemical pumps for supplementing the existing chemical pumps on the hydration unit 18 and blender unit 28. Chemicals from the additive source 24 can be delivered via lines 26 to either the hydration unit 18 and/or the blender unit 28. In one embodiment, the elements of the system 10 are mobile and can be readily transported to a wellsite adjacent the wellbore 12, such as on trailers or other platforms equipped with wheels or tracks.

Figure 2:
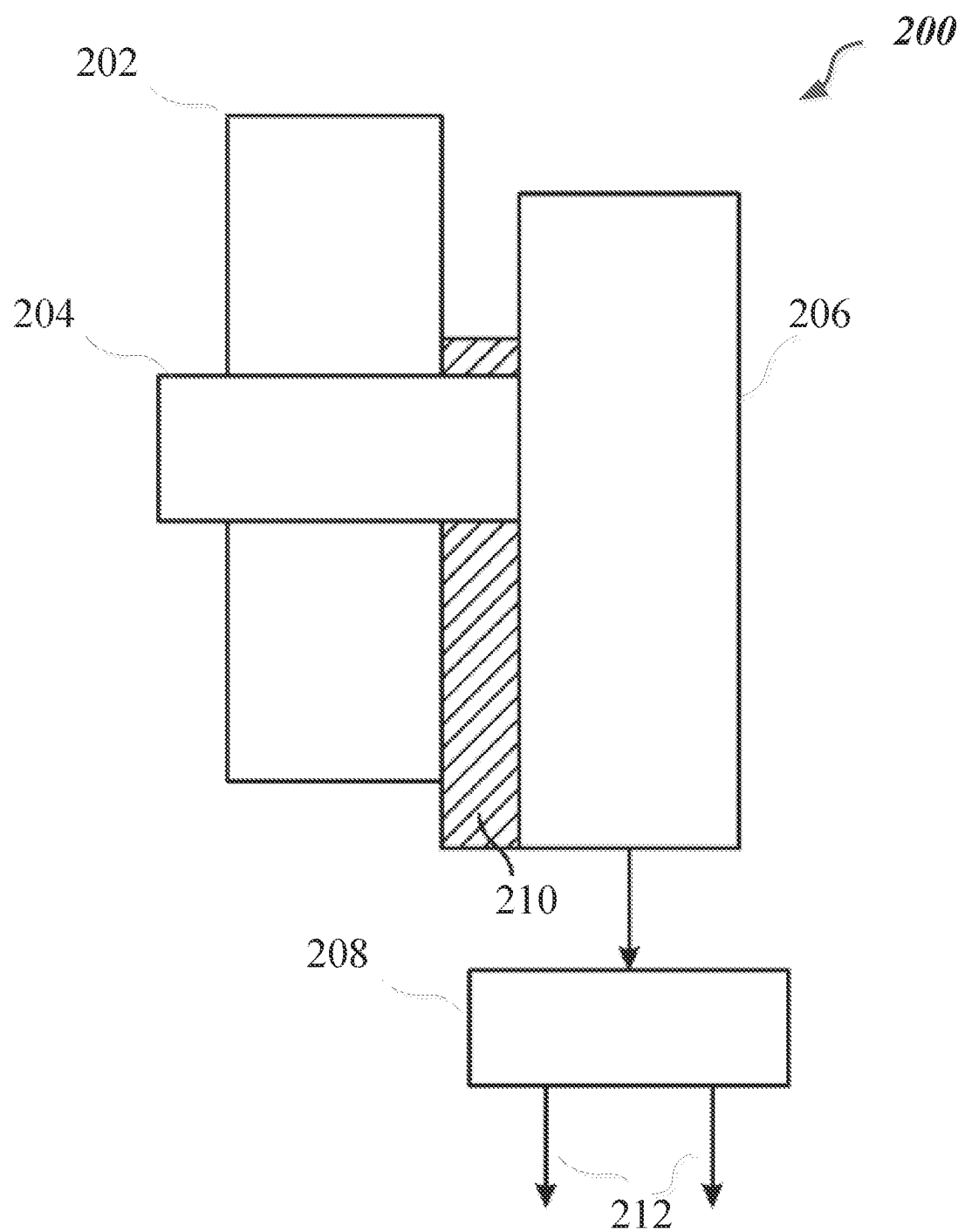
FIG. 2 is an elevation schematic of example portions of an MPU, including at least a turbine, generator, and EER in one or more trailers.

FIG. 2 is an elevation schematic of example portions 200 of the hydraulic fracturing system 10 of FIG. 1. FIG. 1 particularly illustrates some basic components of the hydraulic fracturing system 10 at a wellbore site for providing electrical load sharing. An MPU 200 includes a turbine generator 202 that may be supported by a natural gas turbine engine coupled to a three-phase, 60 hertz (Hz) electric generator to produce power as the turbine engine rotates. In an alternative, the generator can generate electricity at 50 Hz, or at any other frequency useful for hydraulic fracturing fleets. In the illustrated embodiment, the MPU includes components with reference numerals 202, 204, 206, and 210. Reference numeral 202 is a turbine generator mounted within a trailer, for example. However, references to the turbine generator are interchangeably used with reference to a trailer including these components, and the reference numeral 202. The same applies to reference numeral 204 providing an air intake filter, to reference numeral 206 providing an EER (sometimes referred to as a control trailer), and to reference numeral 210 providing a walk area. As such, the MPU is shown as including an electronic equipment room (EER) 206, which can house wiring, breakers, controls, monitoring systems, fire suppression support, auxiliary transformers, and a battery bank for secondary power when the turbine generator is not operating and there is no other power source. Some of the auxiliary components in the EER, such as the fans, lube motors, valves, etc., as well as some of the support equipment, such as gas compressors, gas heaters, and filtration systems, use lower voltage than what is generated. In an example, such lower voltages may be 120V, 240V, and 480V. The auxiliary transformer, in another example, is smaller than the fracturing pump step down transformers. FIG. 1 also illustrates an air intake filter house 204 that may be positioned on top of or adjacent to the MPU turbine generator arrangement 202, and a walk area 210 that may be connected to the MPU turbine generator arrangement 202 and EER 206 to enable personnel access. The example portions 200 can be taken as an example of an electrical microgrid.

In an example, the EER 206 may include other components than recited above and may be named differently but performs the general functions noted above. For example, the EER 206 is a support unit that may be part of the MPU and may include communications, switch gear, fire suppression, motor control center (MCC) for auxiliary loads, technician monitoring space, battery backups for critical auxiliary equipment, transformers, air compressors, and data monitoring/recording. The MPU may have a dedicated trailer for these components alone, while other have parts of this may be integrated into the generator spaces of the MPU.

In some examples, the battery bank of the EER 206 can power lighting, fire suppression, emergency turbine lube pumps, and onboard electronics. A switch gear trailer 208 may provide output 212 for power distribution, high voltage breakers, and "lock-out, tag-out" capabilities. "Lock-out, tag-out" is an understood safety procedure to ensure that dangerous machines are properly shut off and not able to be started up again prior to the completion of maintenance or servicing work.

Figure 3:
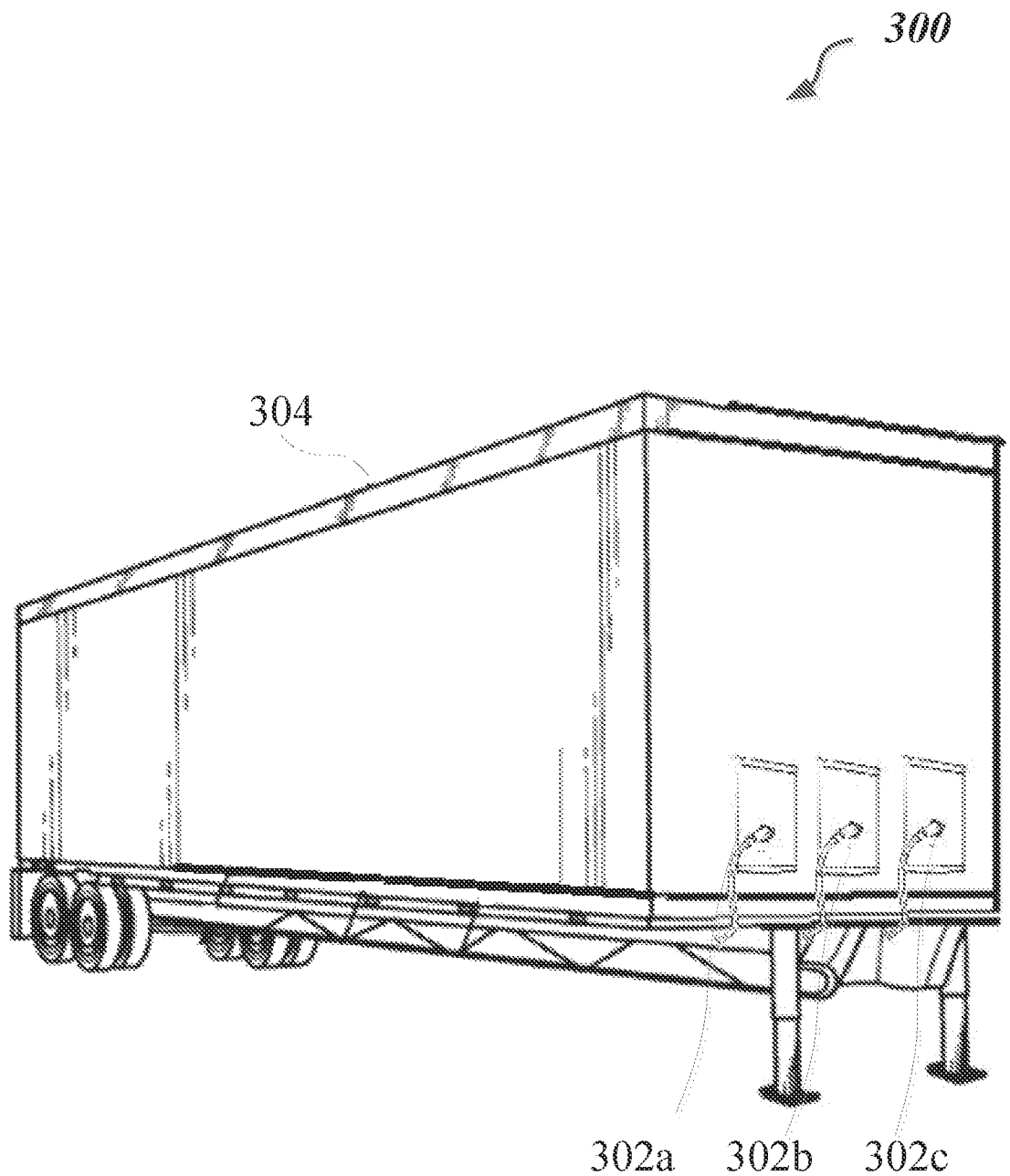
FIG. 3 is an end perspective view of an example of a mobile platform that includes one or more mobile power units (MPUs) that is integrated to or with switch gear components, according to embodiments in the present disclosure.

FIG. 3 is an end perspective view of an example of a mobile platform 300 that includes one or more mobile power units (MPUs) that is integrated to or with switch gear components, according to embodiments in the present disclosure. As such, the mobile platform 300 includes switch gear and MPU components within trailer 304. While the drawings provide a single trailer to demonstrate that the MPU components reside within the single trailer with the switch gear components, this is merely for illustrative purposes. The integration may be by components of the switch gear physically or electrically coupled between and throughout the components for the MPUs. As such, the reference to trailer 304 is merely illustrative to indicate at least where the substantial components for these units may be located.

At least one first switch gear integrated in the MPU provides electrical output connections 302a-c to handle electric power from at least one turbine generator in the trailer 304. The MPUs, therefore, include area for the switch gear, and include the at least one turbine generator that is configured to output a voltage that matches the requirements of load components. In addition, multiple MPUs may be coupled together on a common electrical bus such that a combined electrical current generated as a result of the voltage from the multiple MPUs drives current through the common bus to the components of the hydraulic fracturing system. Example configurations to support such a voltage requirements with current capabilities are provided in FIGS.

4-9. Further, the hydraulic fracturing system of the present disclosure may include electrical fracturing equipment in a separate trailer or on the ground by the wellbore with at least one second switch gear to support the at least one first switch gear providing electrical output connections 302a-c for handling electric power from the MPU in trailer 304, and also, from other MPUs, using a common bus, for instance. A datavan (a separate mobile platform) for data may be included in the system for load shedding, load sharing, and power distribution for the electrical fracturing equipment comprising the at least one second switch gear. As such, a datavan is, herein, referring to a trailer housing communications and controls for all of fracturing system and to enable hydraulic fracturing operations where a focus of the operations is on the wellhead and fluid pumping instead of power generation. The load shedding system may also include load-inhibit functionality to prevent a pump operator from running a pump or system of pumps and other equipment at a higher load level than power can be supplied. In addition, the load shedding system may also take action to drop one or more loads in a predetermined sequence to ensure that the hydraulic fracturing system is not overloaded. In another example, the load shedding system may reduce the rate of pumps and other equipment that are loaded to the hydraulic fracturing system. The reduction of the load in this manner is an alternative to fully shutting off the pumps and the other equipment.

Figure 4:
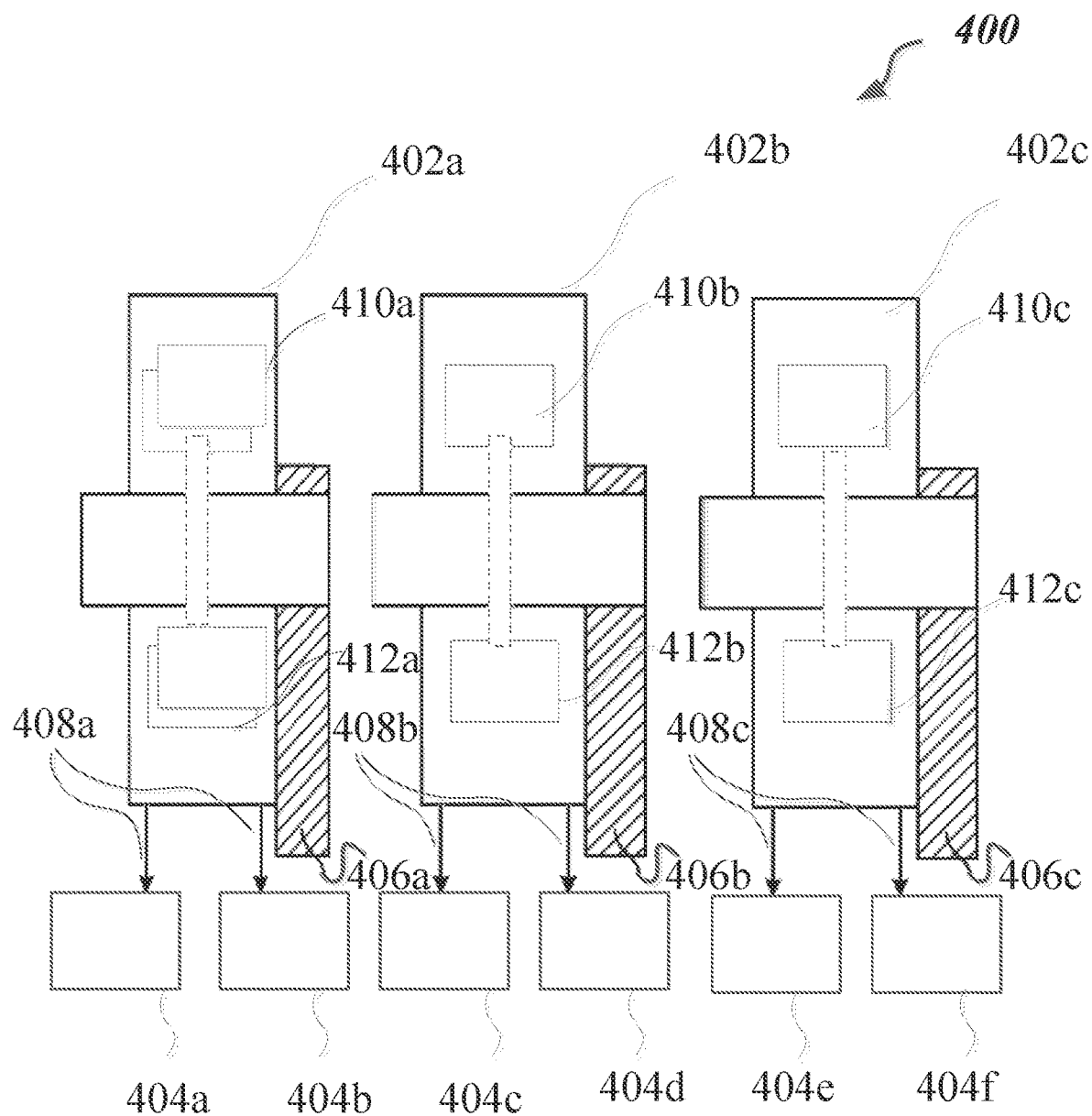
FIG. 4 is an elevation schematic of portions of the hydraulic fracturing system in accordance with one example configuration of the embodiments herein.

FIG. 4 is an elevation schematic of portions 400 of a hydraulic fracturing system in accordance with one example configuration of the present disclosure. MPUs 402a-c include single or multiple turbine generators 410a-c and switch gear 412a-c, which are illustrated as directly powering fracturing pump trailers or units (FPs) 404a-f. In this example configuration, separate switch gear equipment or common bus is not provided. Each respective switch gear (breakers or relays) 412a-c is integrated into each respective trailers 402a-c forming integrated MPUs. Power cable connections 408a-c are provided to transmit power from the turbine generators 410a-c integrated with or to the switch gear 412a-c, shown by dotted lines connecting the boxes 410-412. This may be the case in each trailer or mobile platform forming MPU 402 and couple to the respective FPs 404a-f. Even though the drawings provide the MPU as including the turbine generators and the switch gear as two separate reference numerals 410 and 412 for illustrative purposes, a person of ordinary skill would recognize that these are integration in physical layout or connectivity. This is also the case for the other example configurations provided herein. In addition, transformers may be used between each respective FP 404 and switch gear 412 combination of the embodiment in FIG. 4 to condition the power for use by the fracturing equipment.

Due to the integrated switch gear of this example configuration, the MPUs 402 including the turbine generators 410a-c, may have a smaller power output and can only power a limited number of FPs. Walkways 406a-c are available to access the integrated MPUs and switch gear. The turbine and generator components are downgraded from traditional usage and a single trailer used for the integrated MPU is a heavy duty trailer that includes three or more axles. In example, instead of a traditional four 5.7 MW turbine generator configuration, an integrated MPU may use integrated switch gear with five 5 MW turbine generators. The integration and elimination of the EER and Switch Gear are beneficial to reduce complexity and to promote reliability of a new configuration as presently disclosed. As such, the at least one switchgear used in any embodiment may be physically arranged to replace an EER of at least one mobile unit that may have been designed to include the EER. In addition, an MPU that is integrated with the switch gear in a single trailer eliminates the requirement for the walkway 406 as well. As such, the present embodiments merely illustrate the walkways for exemplary purposes. Further, MPUs 402, may include multiple turbine generators 410a and switch gear 412a. Without a common bus, power cannot be distributed to or from other MPUs. As such, FIG. 4 illustrates each MPU 402 as powering two separate FPs, but it is possible to power a single FP, or multiple FPs depending on the integrated switch gear and power requirements of each pump (or conversely, the power output of each MPU 402a-c). While the reference to an MPU is generally made, the reference may be to a single MPU of a single trailer 402a, b, or c, or to multiple MPUs in each of the single trailers 402a, b, and c. Different hydraulic horsepower requirements are provided and MPU/FP matches are identified for so that they can be added or removed for a modular set up based on specific needs.

Figure 5:
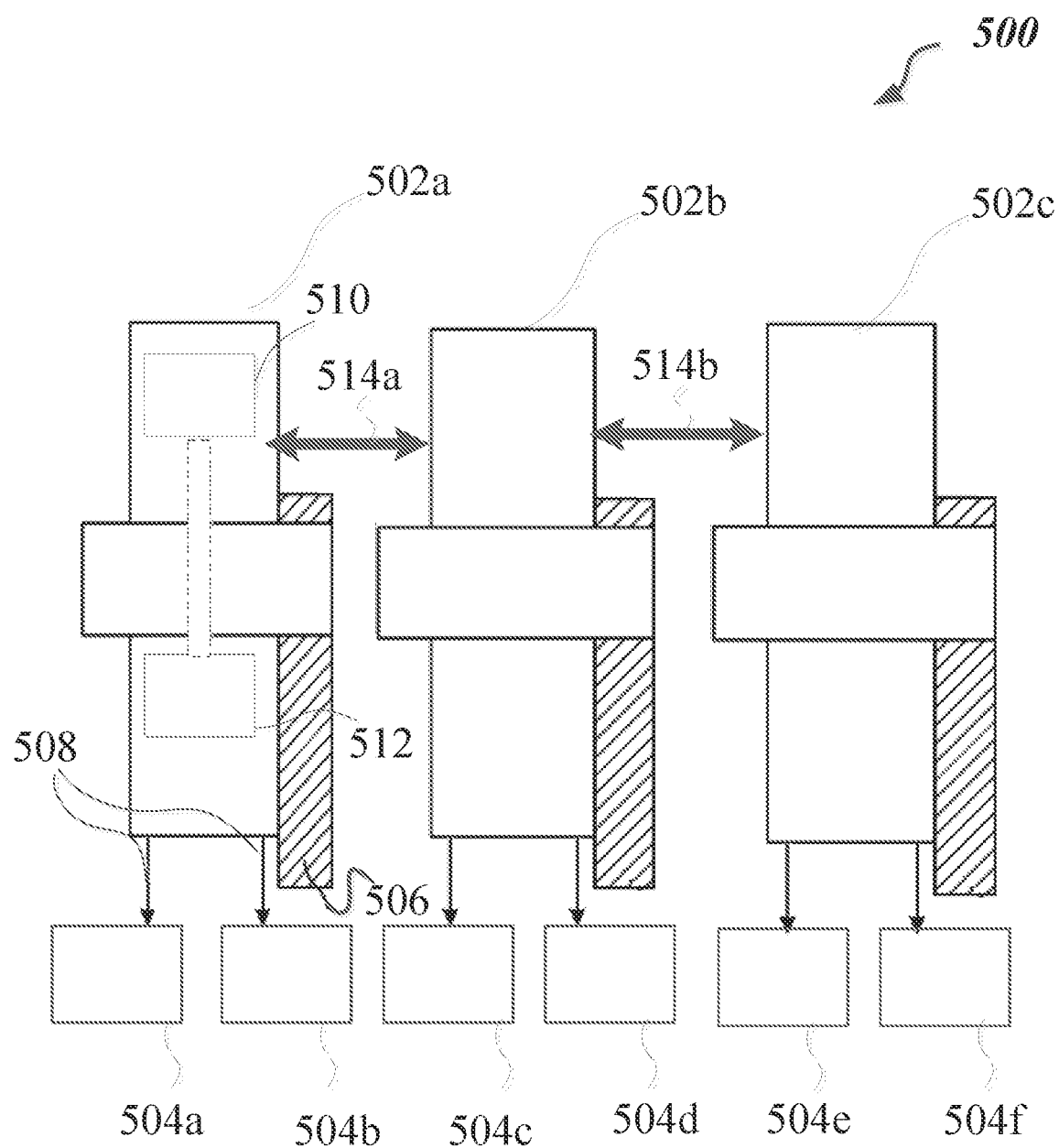
FIG. 5 is an elevation schematic of portions of a hydraulic fracturing system in accordance with another example configuration of the embodiments herein.

FIG. 5 is an elevation schematic of portions 500 of a hydraulic fracturing system in accordance with another example configuration of the present disclosure. Here, the example reference numerals are provided for at least one MPU 502a and FPs 504a,b combination, but a person of ordinary skill would recognize that the description supporting the example reference numerals are available to the other combinations of the mobile platforms 502b,c and FPs 404c-f. In this configuration, power cable interconnects 514a,b are provided between the MPUs 502a-c to act as a common bus for load sharing. As in the prior configuration, optional walkways 506 are provided for personnel access. Power cable connections 508 are provided to transmit power from the turbine generator 510 integrated with the switch gear 512 to the respective FPs 504a-f. Extra components (e.g., fuses, switches, etc.) in switch gear 512 and larger internal busses are additionally provided, as required and as discussed herein, to handle higher electrical loads than a single MPU can output. Communications between turbine control systems (computers) are also provided, as required, to support redundancy in this configuration. As such, a configuration as in FIG. 5 allows the switch gear, interconnect cables, and electrical bus bars are sized to handle all of the available electrical current that can be generated by the combined MPUs.

Alternatively, the sizing is in accordance with a selective use of interconnects for just portions of the system components. Such portions are determined based at least in part on the load ratings provided for the components. In this process, when the selective use is applied, controls are provided to open or close the load sharing switch gear for protection against overcurrent situations. Switches, fuses, and other failsafe components understood to handle overcurrent situations are available in the present disclosure to work with the switch gear. With a common bus 514, it is also possible to apply a load shedding control system which can shutdown (e.g., using a stop command) or which can open a breaker for FPs 504 if the power demand exceeds the available power production. This can happen if extra fluid rate is needed or if wellhead pressure increases unexpectedly, or if an MPU fails. The present disclosure also anticipates that a turbine can fail and electrical load will need to be lowered immediately to prevent the other MPUs from over loading and shutting down for protection. The additional components of the integrated switch gear supports and resolve such issues.

Figure 6:
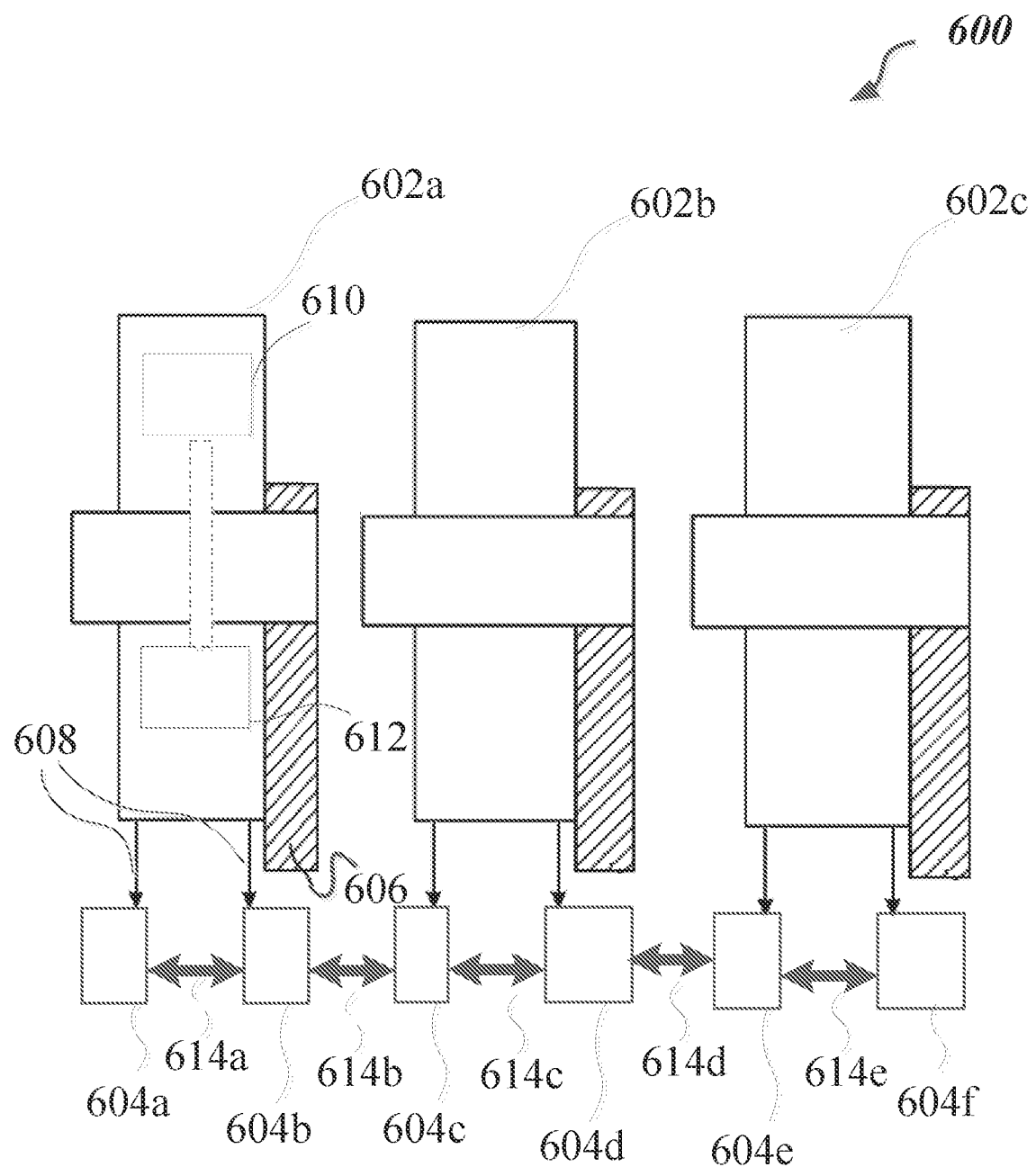
FIG. 6 is an elevation schematic of portions of a hydraulic fracturing system in accordance with yet another example configuration of the embodiments herein.

FIG. 6 is an elevation schematic of portions 600 of a hydraulic fracturing system in accordance with yet another example configuration of the present disclosure. Here, like the prior example, the reference numerals are only provided for at least one MPU 602a and FPs 604a,b combination, but a person of ordinary skill would recognize that the description supporting the example reference numerals are available to the other combinations of the MPUs 602b,c and FPs 604c-f. In this configuration, power cable interconnects 614a-e are provided between a VFD (Variable Frequency Drive)/MCC (Motor Control Center) compartment of the FP 604a-f instead of on the areas for the turbine generator 610 in each of the MPUs 602a-c. As in the prior configuration, optional walkways 606 are provided for personnel access. Power cable connections 608 are provided to transmit power from the MPUs 602 (with integrated switch gear 612 and turbine generator 610) to the respective FPs 604a-f. Extra components (e.g., fuses, switches, etc.) in switch gear 612 and the VFD/MCC and larger internal busses are additionally provided, as required and as discussed herein, to handle higher electrical loads than a single MPU can output.

This example configuration bears similarities to the example configuration of FIG. 5. A difference in this example is that extra load sharing switch gear for the common bus 614 will be in a VFD/MCC compartment of the FP 604 instead of in the area for the turbine generator 610 of the MPU 602. Further, it may not be essential for all interconnecting cables to be used, as long as the fracturing pump trailers 604 are in electrical communication with a source of electric power, a single interconnect will suffice. For example, FP 604a,b does not need to have an interconnect 614a, or FP 604e may not need to have an interconnect 608 with MPU 602c in the illustrated mobile platform as long as it can share power from FP 604d or FP 604f. In this and any of the embodiments, at least one VFD at least one MCC is provided on individual ones of the one or more external mobile units of the embodiments, such that these components, via the one or more external mobile units, is therefore, physically external relative to the mobile unit—such as the MPU 602—hosting the generator and switchgear. However, extra load sharing switch gear may be in the one or more external mobile units.

Figure 7:
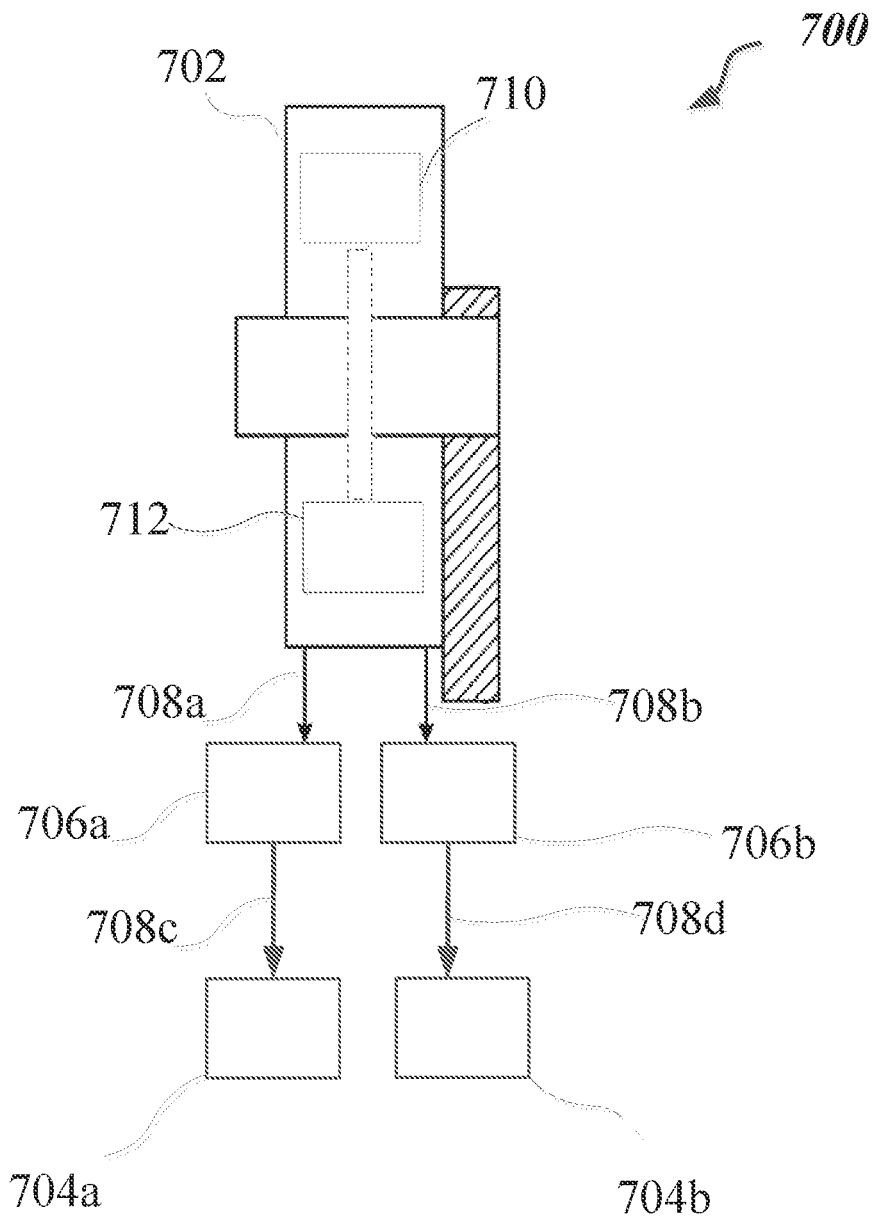
FIG. 7 is an elevation schematic of portions of a hydraulic fracturing system in accordance with further example configurations available using the embodiments herein.

FIG. 7 is an elevation schematic of portions 700 of a hydraulic fracturing system in accordance with further example configurations available in the present disclosure. In this example, a single MPU/FP system is provided. In an example, the FP 704 is a single trailer for fracturing pumps 704a,b. As such, fracturing pumps and fracturing pump trailers are used interchangeably throughout this disclosure. In FIG. 7, the example configuration provides separate transformer skids 706a,b used to step up or step down the voltage for the FP 704a,b. The transformer in transformer skids 706a,b can also be an isolation transformer for filtering out harmonics between the power source (generators) and the load (fracturing equipment in FP 704a,b) with or without changing the voltage. The switch gear 712 is still integrated with the turbine generator 710 and an external switch gear unit may not necessarily be used to act as a common bus or for power distribution. Power cable connections or interconnects 708a,b,c,d are provided to transmit power from the turbine generators 710 that are integrated to the switch gear 712 in the MPU to the respective FPs 704a-f via the transformer skids 706a,b. Interconnects may be implemented in this example as in the examples from FIGS. 5 and 6. A person of ordinary skill would recognize that the embodiments in each of the example configurations may be used interchangeably based on the disclosure herein. As such, one or more power cable interconnects may be configured to couple the mobile unit with a second mobile unit of one or more external mobile units in this and other embodiments. The second mobile unit has at least one second generator and at least one second switch gear and the one or more cable interconnects then enable transmission of power in support of redundancy or load sharing between the mobile unit and the second mobile unit.

The embodiment of FIG. 7 also supports a second implementation where the MPU 702 includes turbine generator 710 and integrated switch gear 712 so as to provide power to one or more pieces of FP equipment in FP unit 704, but the layout of the equipment may be different from the layout of the prior implementation, above, using FIG. 7. For example, in this second implementation using the layout in FIG. 7, the transformer of transformer skid 706a,b (if required) may include a VFD (Variable Frequency Drive) and possibly an MCC (Motor Control Center). As such, the VFD and MCC are on a different separate trailer than the FP 704. This design may allow large fluid pumps to be better positioned relative to wellheads on wellsites, when space is limited. These transformer/VFD/MCC support trailers 706 (in such an embodiment) are herein referred to as Auxiliary Trailers.

Figure 8:
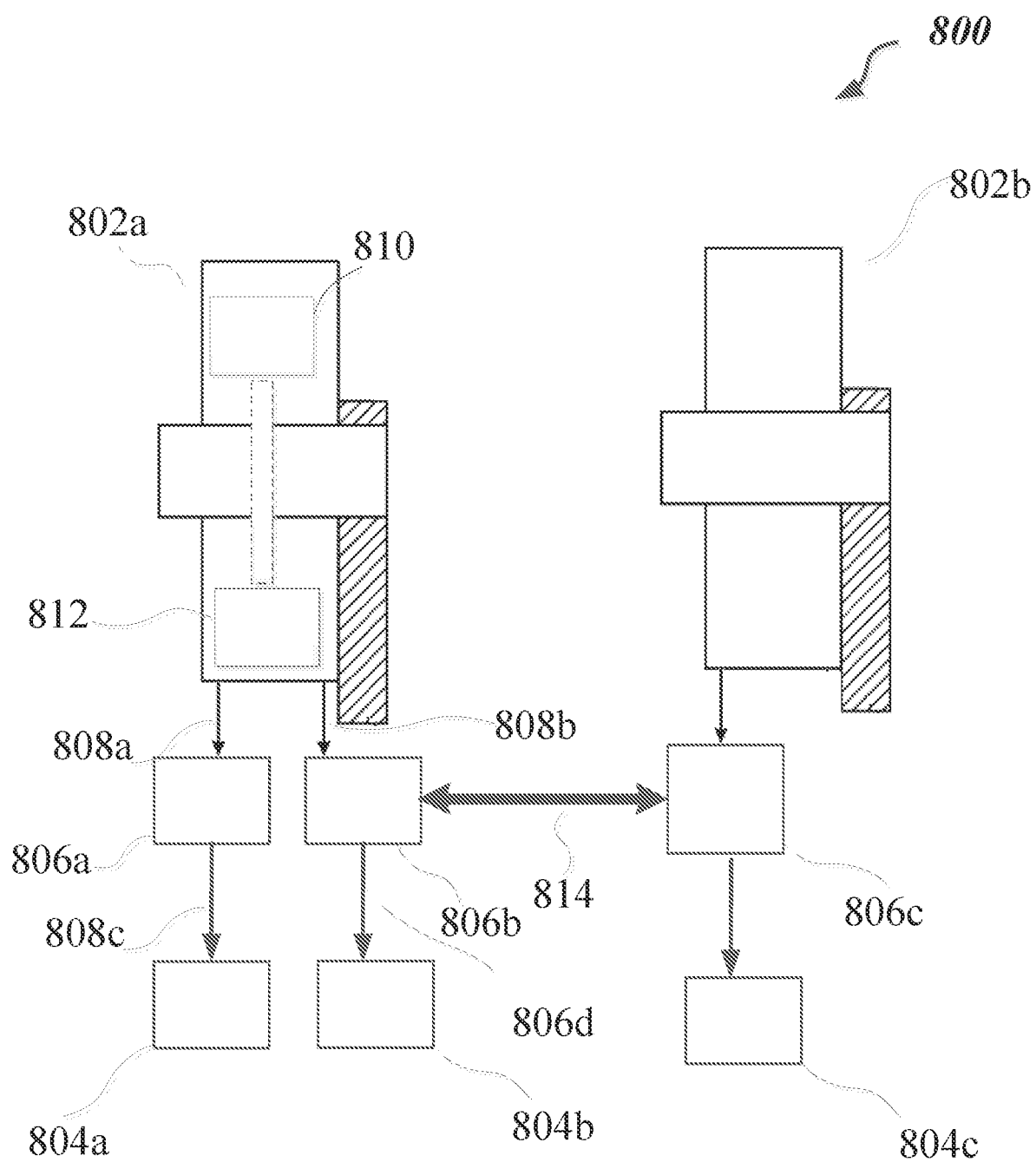
FIG. 8 is an elevation schematic of portions of a hydraulic fracturing system according to other example configurations of the embodiments herein.

FIG. 8 is an elevation schematic of portions 800 of a hydraulic fracturing system according to other example configurations of the present disclosure. This embodiment illustrates load sharing between the transformer skids 806b, c. The remaining reference numerals 802a,b, 810, 812, 808a,b,c,d, 806a, and 804a,b read on similar components or functions from the corresponding reference numerals in FIG. 7—i.e., 702a,b, 710, 712, 708a,b,c,d 706a, and 704a,b. As such, the same discussion from FIG. 7 applies to these components. In addition, in FIG. 8, extra switch gear will need to be integrated into the transformer skid 806b,c which will create a larger skid and will take up more room, or the transformer in the transformer skid 806b,c will need to be downgraded to be smaller, in effect limiting the horsepower of the attached FP unit 804b,c. In this example, load sharing can be on the incoming side of the transformer or the outgoing side (secondary voltage). When the load sharing takes place on the incoming side, the switch gear, bus bars, and cable interconnects is sized based in part on the current available at the generated voltage. When the load sharing equipment is on the outgoing side (e.g., when it can be stepped up or stepped down) then the switch gear, bus bars, and cable interconnects are sized based in part on the current available on the secondary side of the transformer.

In an example, when an interconnect is provided between transformers of at least two mobile units of the one or more external mobile units, as in the embodiment of FIG. 8, then the interconnect for load sharing between the transformers can be configured based at least in part on currents available from a secondary side of the transformer. For example, at least one load sharing switch gear is provided that is optionally associated with at least one of the transformers and configured for load sharing on an incoming side of the at least one of the transformers. This arrangement is such that the at least one load sharing switch gear, associated bus bars, and associated cable interconnects are sized based at least in part on current available for a voltage output of a secondary side of the of the at least one of the transformers. In an alternative or together with the above load sharing example, when the at least one load sharing switch gear is configured for load sharing on an outgoing side of the at least one of the transformers, a different arrangement may be provided. The different arrangement is such that the at least one load sharing switch gear, the associated bus bars, and the associated cable interconnects are sized based at least in part on the current available at the secondary side of the transformer.

Figure 9:
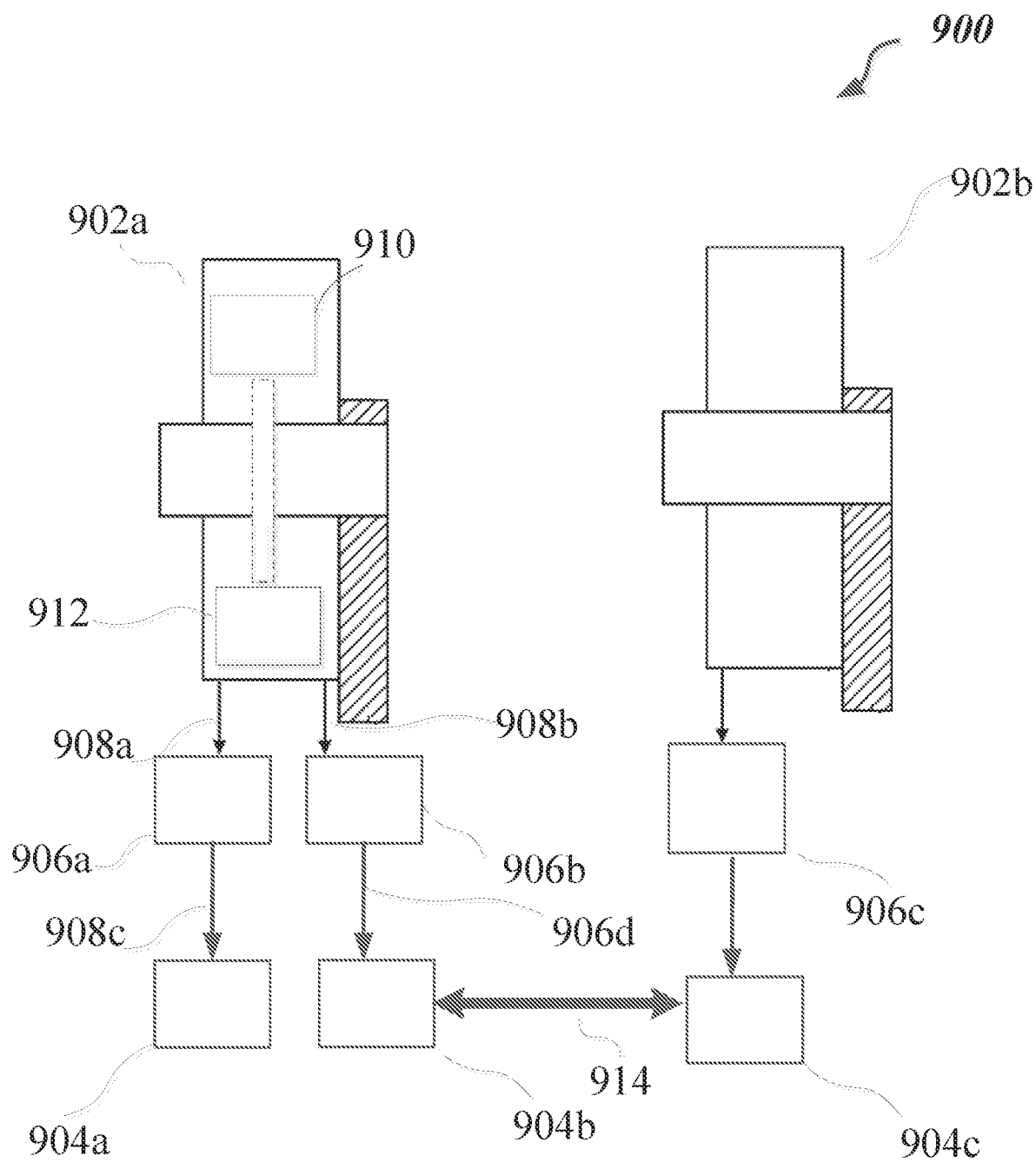
FIG. 9 is an elevation schematic of portions of a hydraulic fracturing system according to other example configurations of the embodiments herein.

FIG. 9 is an elevation schematic of portions 900 of a hydraulic fracturing system according to further example configurations available in the present disclosure. This embodiment illustrates load sharing taking place on the FP units 904b,c. The remaining reference numerals 902a,b, 910, 912, 908a,b,c,d, 906a, and 904a,b read on similar components or functions from the corresponding reference numerals in FIG. 8—i.e., 802a,b, 810, 812, 808a,b,c,d 806a, and 804a,b. As such, the same discussion from FIGS. 7 and 8 applies to these components. When the FP 904b,c have onboard VFD/MCC rooms or compartments, it may be possible to add extra switch gear for load sharing in those rooms. The load sharing will be on the secondary side of the transformer in transformer skid 906a-c. For example, if the transformer in transformer skid 906a-c is stepping the voltage down from 13,800V to 600V, the electrical current requirements will be higher than required if this was not the case. While this may not be ideal current requirements, and will require larger load sharing gear, this implementation saves space on the MPUs 902 at the cost of consuming space on the FP 904, which may be preferable in some cases. In this embodiment, a datavan can possibly perform the load shedding control duties instead of the MPUs 910. As previously noted, datavan is a trailer housing communications and controls for all of the FP equipment for hydraulic fracturing operations where the focus is on the wellhead and fluid pumping instead of power generation. All FP equipment communicate with the datavan for control, when load sharing switch gear is onboard the FP 904, it can be controlled from the datavan instead of the MPU 910.

Figure 10:
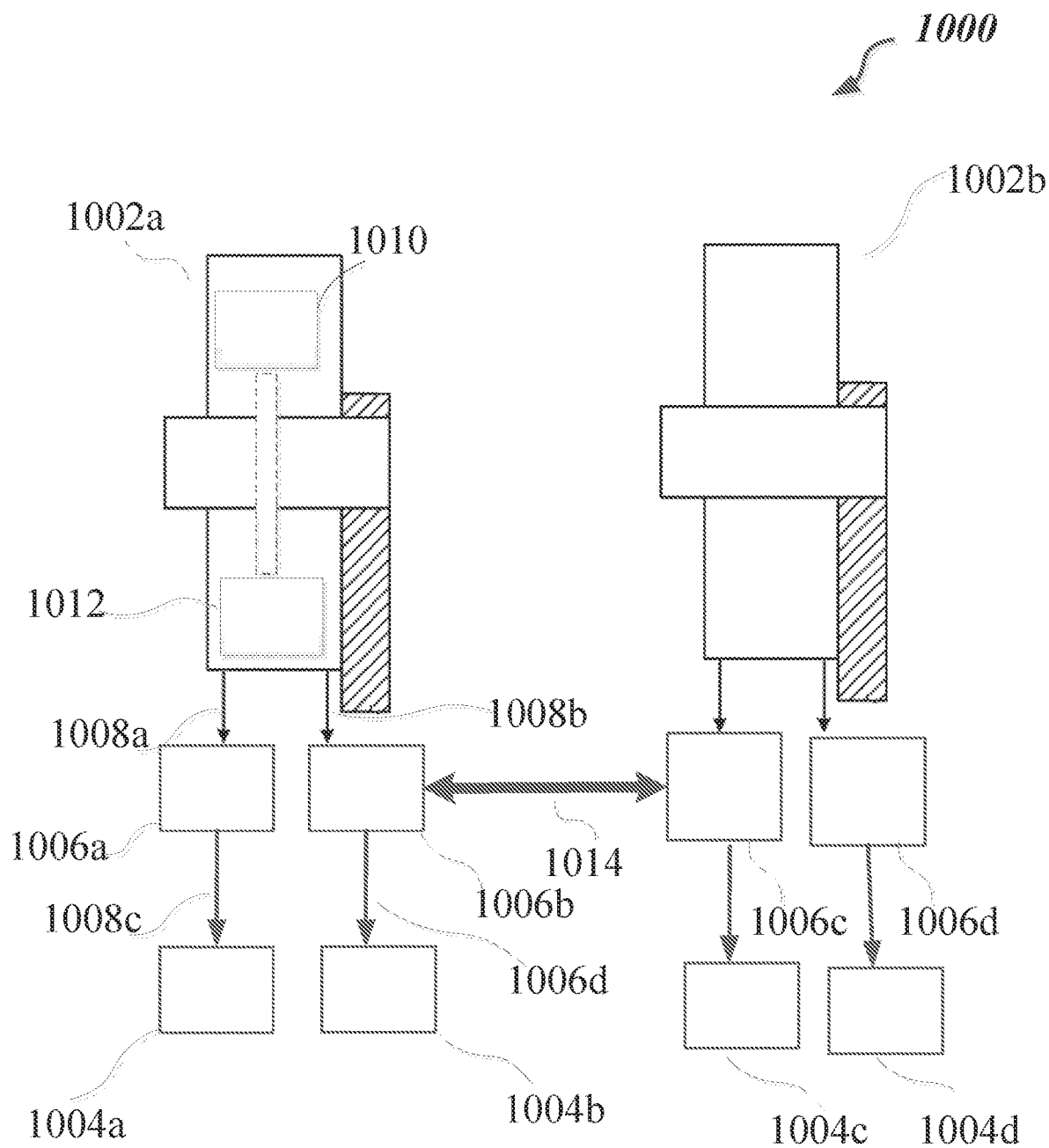
FIG. 10 is an elevation schematic of portions of a hydraulic fracturing system according to other example configurations of the embodiments herein.

FIG. 10 is an elevation schematic of portions 1000 of a hydraulic fracturing system according to yet another example configuration available in the present disclosure. In this embodiment, a configuration and associated method is provided for load sharing where the Auxiliary Trailers 1006b,c (such as described in the alternate embodiment of FIG. 7) houses extra load sharing gear. This configuration saves space on the MPUs 1002 and will allow the load sharing to be on the high voltage side of the transformer. The remaining reference numerals 1002a,b, 1010, 1012, 1008a, b,c,d, 1006a,d and 1004a,b read on similar components or functions from the corresponding reference numerals in FIG. 9—i.e., 902a,b, 910, 912, 908a,b,c,d 906a, and 904a,b. As such, the same discussion from FIGS. 7, 8, and 9 applies to these components. When a step up transformer is used in this embodiment, the load sharing can take place on the secondary side—similarly discussed with respect to FIG. 7. When a step down transformer is used, the load sharing can take place on the primary side. This process also maintains all of the electrical gear off of the FP trailers 1004. Only one load sharing interconnect 1014 is illustrated for simplicity, but in reality, the Auxiliary Trailers 1006b,c can have as many load sharing breakers as need to form as common bus. In many situations, two interconnects may be sufficient, but it is feasible to maintain more available interconnects to simplify interconnecting cable layouts or to electrically bypass failed equipment. Electrical load sharing may be preferable at higher voltages due to the current (amperage) requirements being smaller, therefore smaller cables and switch gear can be used.

In addition, many of the above embodiments show additional switch gear integrated into the MPU to allow load sharing between MPUs for a common bus. In these embodiments, a large three phase power cable may be interconnected between the load sharing switch gear to any adjacent MPUs integrated with other load sharing switch gear. However, the extra gear and a larger internal bus that may be needed to carry the higher electrical current will require compensation in the form of the turbine engines and generators being even smaller to allow mobility of the system.

The above embodiments may be combined in any manner as is readily apparent to a person of ordinary skill reading the present disclosure. In the above embodiments and any combinations therefrom, at least one fracturing pump (FP) mobile unit may be provided as part of one or more external mobile units. The at least one FP mobile unit is physically external relative to the mobile unit having a generator and switch gear for generating power for the at least one FP mobile unit. Further, a predetermined number of FP mobile units include in the one or more external mobile units may be determined for the system described throughout this disclosure. The predetermined number of FP mobile units may be determined by a maximum of the power available from the at least one generator and handled by the at least one switch gear.

In a further example, a predetermined number of generators including the at least one generator may be determined for the system of the present disclosure. In an aspect, the predetermined number of generators is determined such that each of the predetermined number of generators has a power output value that is lesser than a power output of an isolated single generator occupying all available space in an independent mobile unit physically external to the mobile unit. As the generator and switch gear are being integrated to a singular and integrated mobile unit, the space is limited and lower rating equipment may be provided instead. Other embodiments to the above embodiments allow for extra integrated switch gear for a common bus integrated into the FP trailers or with an external transformer and/or VFD skids—i.e., in the Auxiliary Trailers. This extra integrated switch gear may require additional space consumption which may force the FP trailer to incorporate equipment with lower hydraulic horsepower rating due to smaller motors/pumps to allow all of these components to fit onto a mobile platform. Further, large three phase cables, or multiple single phase cables can be used for electrical power interconnects. The above embodiments are described as capable of supporting several common voltages, such as 25 KV, 13.8 KV, 6.6 KV, 4160V, 2000V, 600V, 690V, 480V, all at +/−5%. However, any voltage is feasibly based on the capabilities of the generators used and on the ratings of the components requiring the generated power. For load sharing capabilities, higher voltage may be better appreciated and issues may arise with voltages below 5,000V. While it may not be possible to practically size switch gear, bus bars, and interconnecting cables to be able to handle the electrical current for an entire fracturing fleet at voltages below 5,000V to form a common bus, minor load sharing between two individual pumps (FP units) may still be possible even at low voltages.

The technology herein can be used for equipment where the voltage is constant, such as when the load operates at the same voltage as the generated voltage. Alternatively, the technology and equipment herein can be used where step up or step transformers are used to alter the voltage for the attached load (FP units). Examples of components in the FP units include blenders, hydration units, chemical units, proppant equipment, lights, auxiliary water pumps, monitoring equipment, data collection offices, personnel trailers, cranes, gas compression equipment, gas filtering equipment, heating equipment, and other third party equipment that is used on well sites.

Figure 11:
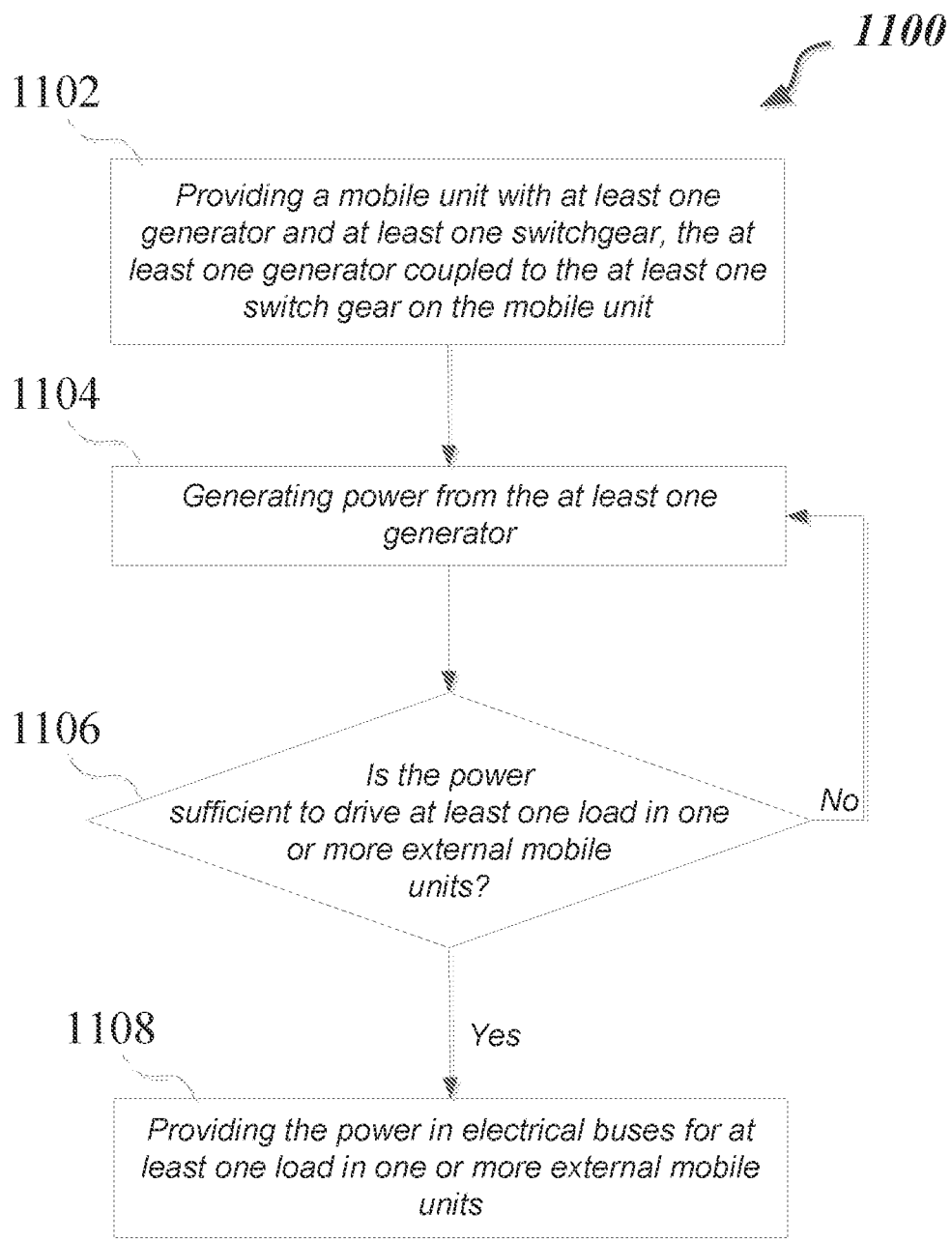
FIG. 11 is a flowchart of a hydraulic fracturing method using the example configurations of the embodiments herein.

FIG. 11 is a flowchart 1100 of a hydraulic fracturing method using to example configurations of the embodiments herein. The method includes a sub-process 1102 for providing a mobile unit with at least one generator and at least one switchgear, such as a system as described above. The at least one generator is coupled to the at least one switch gear on the mobile unit. The method includes sub-process 1104 for generating power from the at least one generator. The system may be part of a hydraulic fracturing system that consumes the power and that includes a wellbore and at least one pressuring system to create fractures in a subterranean formation that surrounds the wellbore. A verification is performed via sub-process 1106 for the power generated being sufficient to drive at least one load of the one or more external mobile units. When such verification is positive, sub-process 1108 provides the power in electrical busses for at least one load in the one or more external mobile units. Power may be generated via sub-process 1104 till the capacity is achieved if the verification in sub-process 1106 is negative.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, other the recesses can be put into arrangements other than those described, such as all being in a vertical or other arrangement. These and other similar modifications will readily suggest themselves to those skilled in the art, and are intended to be encompassed within the spirit of the present invention disclosed herein and the scope of the appended claims.

In the various embodiments of the disclosure described, a person having ordinary skill in the art will recognize that alternative arrangements of components, units, conduits, and fibers could be conceived and applied to the present invention.

The singular forms "a," "an," and "the" include plural referents, unless the context clearly dictates otherwise.

Examples of computer-readable medium used in the datavan and in the communications achieved in the present embodiments can include but are not limited to: one or more nonvolatile, hard-coded type media, such as read only memories (ROMs), CD-ROMs, and DVD-ROMs, or erasable, electrically programmable read only memories (EEPROMs); recordable type media, such as floppy disks, hard disk drives, CD-R/RWs, DVD-RAMs, DVD-R/RWs, DVD+R/RWs, flash drives, memory sticks, and other newer types of memories; and transmission type media such as digital and analog communication links. For example, such media can include operating instructions, as well as instructions related to the systems and the method steps described previously and can operate on a computer. It will be understood by those skilled in the art that such media can be at other locations instead of, or in addition to, the locations described to store computer program products, e.g., including software thereon. It will be understood by those skilled in the art that the various software modules or electronic components described previously can be implemented and maintained by electronic hardware, software, or a combination of the two, and that such embodiments are contemplated by embodiments of the present disclosure.

What is claimed is:

1. A system comprising:
a first mobile unit comprising at least one generator and at least one switch gear, the at least one switch gear sized to support voltage and current outputs of a second mobile unit in a load sharing arrangement with the first mobile unit and also sized to voltage and current requirements for at least one load on one or more external mobile units that is powered by the load sharing arrangement.

2. The system of claim 1, further comprising:
at least one transformer, an interconnect, and a bus bar, all to be associated with the at least one switch gear and all to be also sized to the voltage and current requirements for the at least one load on one or more external mobile units that is powered by the load sharing arrangement.

3. The system of claim 1, wherein the system is part of a hydraulic fracturing system that contributes to the voltage and current requirements and that comprises a wellbore and at least one pressuring system to create fractures in a subterranean formation that surrounds the wellbore.

4. The system of claim 1, further comprising:
at least one fracturing pump (FP) mobile unit of the one or more external mobile units, the at least one FP mobile unit physically external relative to the first mobile unit, wherein at least one transformer is provided to condition power associated with the voltage and current requirements and supplied to the at least one FP mobile unit.

5. The system of claim 1, further comprising:
a predetermined number of FP mobile units comprised in the one or more external mobile units, the predetermined number of FP mobile units determined by a maximum power available from the at least one generator and handled by the at least one switch gear.

6. The system of claim 1, further comprising:
a predetermined number of first generators comprising the at least one generator, the predetermined number of first generators having individual power output values that is lesser than a power output of an isolated single generator occupying all available space in an independent mobile unit physically external to the first mobile unit.

7. The system of claim 1, further comprising:
the at least one switchgear being physically arranged to replace an electronic equipment room (EER) of at least one of the one or more external mobile units that is designed to comprise the EER.

8. The system of claim 1, further comprising:
at least one Variable Frequency Drive (VFD); and
at least one Motor Control Center (MCC), the VFD and the MCC being on individual ones of the one or more external mobile units that is physically external relative to the first mobile unit.

9. The system of claim 1, further comprising:
an interconnect configured to couple the first mobile unit with the second mobile unit, the second mobile unit having at least one second switch gear in addition to a second generator, the interconnect to transmit power in support of redundancy in addition to the load sharing arrangement between the first mobile unit and the second mobile unit.

10. The system of claim 1, further comprising:
the at least one switch gear configured in the load sharing arrangement by being in part on an incoming side of at least one transformer, the sizing of the at least one switch gear based at least in part on current available for a voltage output of a secondary side of the at least one transformer that is coupled to the at least one generator and to a second generator of the second mobile unit; or the at least one switch gear configured in the load sharing arrangement by being in part on an outgoing side of the at least one transformer, the sizing of the at least one switch gear based at least in part on current available at the secondary side of the at least one transformer that is coupled to the at least one generator and to a second generator of the second mobile unit.

11. The system of claim 1, further comprising:
at least one load sharing FP mobile unit coupled, as part of the at least one load, with a second FP mobile unit of the one or more external mobile units; and
a datavan in the one or more external mobile units for control of the at least one load sharing FP mobile unit, the datavan offering the control of the at least one load sharing FP mobile unit instead of a second control available from within the first mobile unit.

12. The system of claim 1, further comprising:
an isolation transformer or a step down transformer that is located in the one or more external mobile units to be physically external relative to the first mobile unit and to be electrically coupled between the at least one generator and the at least one load.

13. A method comprising:
providing a first mobile unit comprising at least one generator and at least one switch gear;
generating power from the at least one generator for at least one load on one or more external mobile units; and
providing the power using the at least one switch gear, the at least one switch gear sized to support voltage and current outputs of a second mobile unit in a load sharing arrangement with the first mobile unit and also sized to voltage and current requirements for the at least one load on the one or more external mobile units that is powered by the load sharing arrangement.

14. The method of claim 13, further comprising:
providing at least one fracturing pump (FP) mobile unit of the one or more external mobile units, the at least one FP mobile unit physically external relative to the first mobile unit; and
conditioning the power supplied to the at least one FP mobile unit using at least one transformer of the at least one switch gear.

15. The method of claim 13, further comprising:
determining a number of FP mobile units for the one or more external mobile units based at least in part on a maximum power available from the at least one generator and handled by the at least one switch gear.

16. The method of claim 13, further comprising:
determining a number of first generators for the at least one generator based at least in part on the number of first generators having individual power output values that is lesser than a power output of an isolated single generator occupying all available space in an independent mobile unit physically external to the first mobile unit.

17. The method of claim 13, further comprising:
physically arranging the at least one switch gear to replace an electronic equipment room (EER) of at least one of the one or more external mobile units that is designed to comprise the EER.

18. The method of claim 13, further comprising:
providing at least one Variable Frequency Drive (VFD) to be associated with the at least one switch gear; and
providing at least one Motor Control Center (MCC), the VFD and the MCC being on individual ones of the one or more external mobile units that is physically external relative to the first mobile unit.

19. The method of claim 13, further comprising:
coupling the first mobile unit with the second mobile unit using an interconnect, the second mobile unit having at least one second switch gear in addition to a second generator, the interconnect to transmit power in support of redundancy in addition to the load sharing arrangement between the first mobile unit and the second mobile unit.

20. The method of claim 13, further comprising:
coupling at least one load sharing FP mobile unit to share the at least one load of a second FP mobile unit of the one or more external mobile units; and
controlling, via a datavan in the one or more external mobile units, the at least one load sharing FP mobile unit, the datavan offering the control of the at least one load sharing FP mobile unit instead of a second control available from within the first mobile unit.

* * * * *